US005594719A

United States Patent [19]
Oh et al.

[11] Patent Number: 5,594,719
[45] Date of Patent: Jan. 14, 1997

[54] METHOD FOR CONTROLLING ECHO CANCELLER CIRCUIT

[75] Inventors: Don-Sung Oh; Dong-Jin Shin, both of Daejeon, Rep. of Korea

[73] Assignee: Electronics and Telecommunications Research Institute, Daejeon, Rep. of Korea

[21] Appl. No.: 350,019

[22] Filed: Nov. 29, 1994

[30] Foreign Application Priority Data

Jul. 12, 1994 [KR] Rep. of Korea ................ 94-16752

[51] Int. Cl.$^6$ ............................................. H04J 3/00
[52] U.S. Cl. ..................... 370/286; 379/410; 379/411; 395/800
[58] Field of Search .......................... 370/32.1, 24, 29, 370/30, 85.13, 62; 395/800; 379/410, 411, 406

[56] References Cited

U.S. PATENT DOCUMENTS

| 4,554,417 | 11/1985 | Boyer | 179/170.2 |
|---|---|---|---|
| 5,157,653 | 10/1992 | Genter | 370/32.1 |
| 5,177,734 | 1/1993 | Cummiskey et al. | 370/32.1 |
| 5,307,505 | 4/1994 | Houlberg et al. | 370/85.13 |
| 5,349,687 | 9/1994 | Ehlig et al. | 395/800 |
| 5,396,641 | 3/1995 | Iobst et al. | 395/800 |
| 5,452,289 | 9/1995 | Sharma et al. | 370/32.1 |
| 5,453,986 | 9/1995 | Davis et al. | 370/62 |

Primary Examiner—Douglas W. Olms
Assistant Examiner—Shick Hom
Attorney, Agent, or Firm—Antonelli, Terry, Stout & Kraus, LLP

[57] ABSTRACT

The invention is a method for controlling an echo canceller circuit including a data storage for storing a program for processing digital signals to cancel an echo in PCM encoded voice data, a plurality of digital signal processors each having a reset terminal and which are downloaded with the program which is executed by the plurality of digital signal processor to carry out removal of the echo in the PCM encoded voice data, and a one chip controller for performing control functions of the echo canceller. The method comprises the steps after completion of initialization of the one chip controller, controlling the reset terminals of the digital signal processors to maintain all of the digital signal processors in reset state; releasing one digital signal processor from the reset state and downloading the program to the one released digital signal processor from the data storage; and the released one digital signal processor processing the PCM encoded voice data with the program to remove the echo from the PCM encoded voice data.

5 Claims, 5 Drawing Sheets

FIG.4

| Step | DSP to be downloaded | Reset signal | | Off signal | |
|---|---|---|---|---|---|
| | | Enable | Disable | Enable | Disable |
| 1 | DSP 0 | DSP 1–7 | DSP 0 | DSP 1–7 | DSP 0 |
| 2 | DSP 1 | DSP 2–7 | DSP 0–1 | DSP 0,2–7 | DSP 1 |
| 3 | DSP 2 | DSP 3–7 | DSP 0–2 | DSP 0–1,3–7 | DSP 2 |
| 4 | DSP 3 | DSP 4–7 | DSP 0–3 | DSP 0–2,4–7 | DSP 3 |
| 5 | DSP 4 | DSP 5–7 | DSP 0–4 | DSP 0–3,5–7 | DSP 4 |
| 6 | DSP 5 | DSP 6–7 | DSP 0–5 | DSP 0–4,6–7 | DSP 5 |
| 7 | DSP 6 | DSP 7 | DSP 0–6 | DSP 0–5,7 | DSP 6 |
| 8 | DSP 7 | NONE | DSP 0–7 | DSP 0–6 | DSP 7 |

METHOD FOR CONTROLLING ECHO CANCELLER CIRCUIT

BACKGROUND OF THE INVENTION

1. Field of the Invention

The present invention relates to an echo canceller circuit for removing an echo which is produced during an interlocking between a public land mobile network (PLMN) and a public switched telephone network (PSTN). More specifically, the present invention relates to a method for controlling the echo canceller circuit in which a one chip controller is used to control a plurality of digital signal processors (DSP).

2. Description of the Prior Art

During an interlocking between the PLMN and the PSTN, when there is a voice transmission from a PLMN subscriber, the voice of the subscriber is transmitted through the PLMN and the PSTN to a PSTN subscriber. In this process, an echo is generated due to an impedance mismatch in a 2-line/4-line hybrid circuit which is disposed in the PSTN subscriber match portion.

Owing to the voice coding for improving the efficacy of the non-channel feature of the PLMN, the echo is delayed by about 180 ms to return to the PLMN subscriber, thereby causing an inconvenience in the communications. Therefore, a need for removing such an echo has arisen.

The conventional echo canceller circuit for removing the echo includes: a plurality of digital adaptive filters; and a control circuit for controlling them. The control circuit which controls the plurality of the digital adaptive filters includes a plurality of elements, and therefore, the circuit is complicated, as well as being expensive.

SUMMARY OF THE INVENTION

The object of the present invention is to provide a method for controlling an echo canceller circuit which is formed in a simple and economical form.

In achieving the above object, the present invention uses a plurality of digital signal processors (DSP) for removing the echo, Instead of the conventional digital adaptive filters. A DSP program which is required for the operation and control of the DSP is not stored in each DSP, but is stored in an external memory device such as an EPROM. During the initiation, the plurality of the DSPs are downloaded with the DSP program under the control of a one chip (integrated circuit) controller, thereby carrying out the removal of the echo.

Further, in the communications between the one chip controller and the plurality of the DSPs, the one chip controller performs bus arbitration. Therefore, the bus can be used commonly without using a separate bus arbitration circuit.

In the preferred embodiment of the present invention, one DSP is assigned to four channels to remove the echo, and in overall terms, eight DSPs are used to remove the echo for 32 channels, while the eight DSPs are controlled by a one chip controller.

BRIEF DESCRIPTION OF THE DRAWINGS

The above object and other advantages of the present invention will become more apparent by describing in detail the preferred embodiment of the present invention with reference to the attached drawings in which:

FIG. 4 is a table showing the status of reset and off signals of the respective DSPs when one of the DSPs is downloaded with the program from the EPROM.

DESCRIPTION OF THE PREFERRED EMBODIMENT

Figure 1:
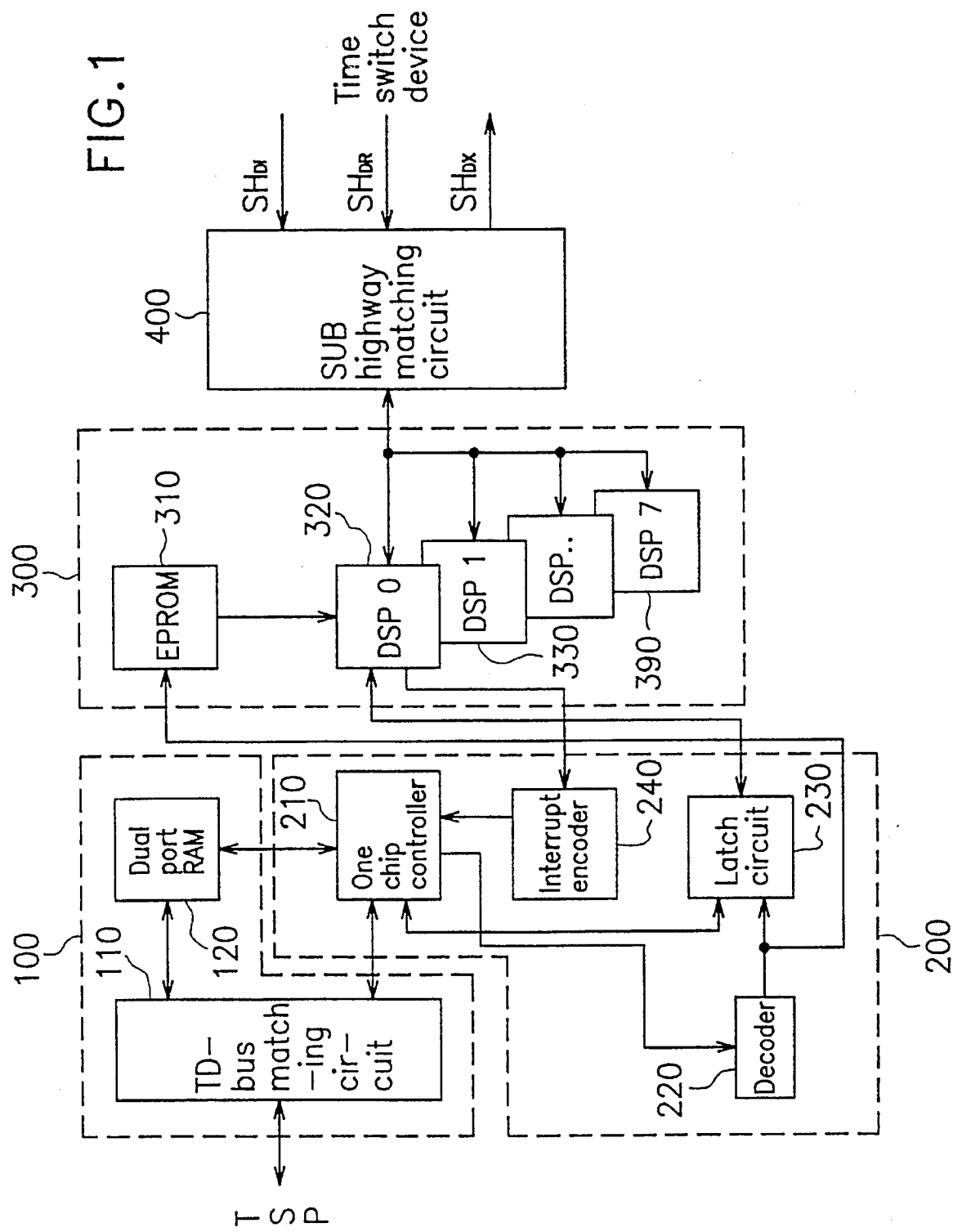
FIG. 1 is a block diagram showing the constitution of the hardware of the echo canceller circuit on which the method of the present invention is applied.

FIG. 1 is a block diagram showing the constitution of the hardware of the echo canceller circuit to which the method of the present invention is applied.

The apparatus of FIG. 1 includes: a TD bus (telephony device bus) matching circuit 110 for sending and receiving information to and from a time switched control processor (TSP) of a known type; a TD bus matching section 100 composed of a dual port RAM 120 serving as a buffer for temporarily storing the information transmitted between the TSP and the echo canceller circuit; a one chip controller 210 for carrying out various control functions related to the echo removal; a decoder 220 for receiving addresses from the one chip controller 210 to select a necessary device in accordance with the received address; a latch circuit 230 for latching the control data which are required for controlling eight DSPs 320–390 by the one chip controller 210; an interrupt encoder 240 for sending the required data to the one chip controller 210, so that the one chip controller 210 recognizes which DSP among the eight DSPs 320–390, generated an interrupt to permit the one chip controller 210 to manage output of interrupts from the eight DSPs 320–390; a control section 200 composed of the one chip controller 210, the decoder 220, the latch circuit 230 and the interrupt encoder 240; a DSP section 300 composed of; an EPROM 310 for storing a DSP program to be downloaded to the DSPs 320–390 eight DSPs 320–390 for carrying out the actual echo removal by carrying out the function of the digital adaptive filters; and a sub-highway matching circuit 400 required for carrying out processing of PCM voice data with a time switched device.

In the present invention, a DSP program is downloaded from the EPROM 310 of the DSP section 300 to internal RAMs of the eight DSP 320–390 under the control of the control section 200. Under the control of the one chip controller 210 of the control section 200, the decoder 220, the latch circuit 230 and the interrupt encoder 240 support the communications between the one chip controller 210 and the DSPs 320–390 of the DSP section 300.

Figure 2:
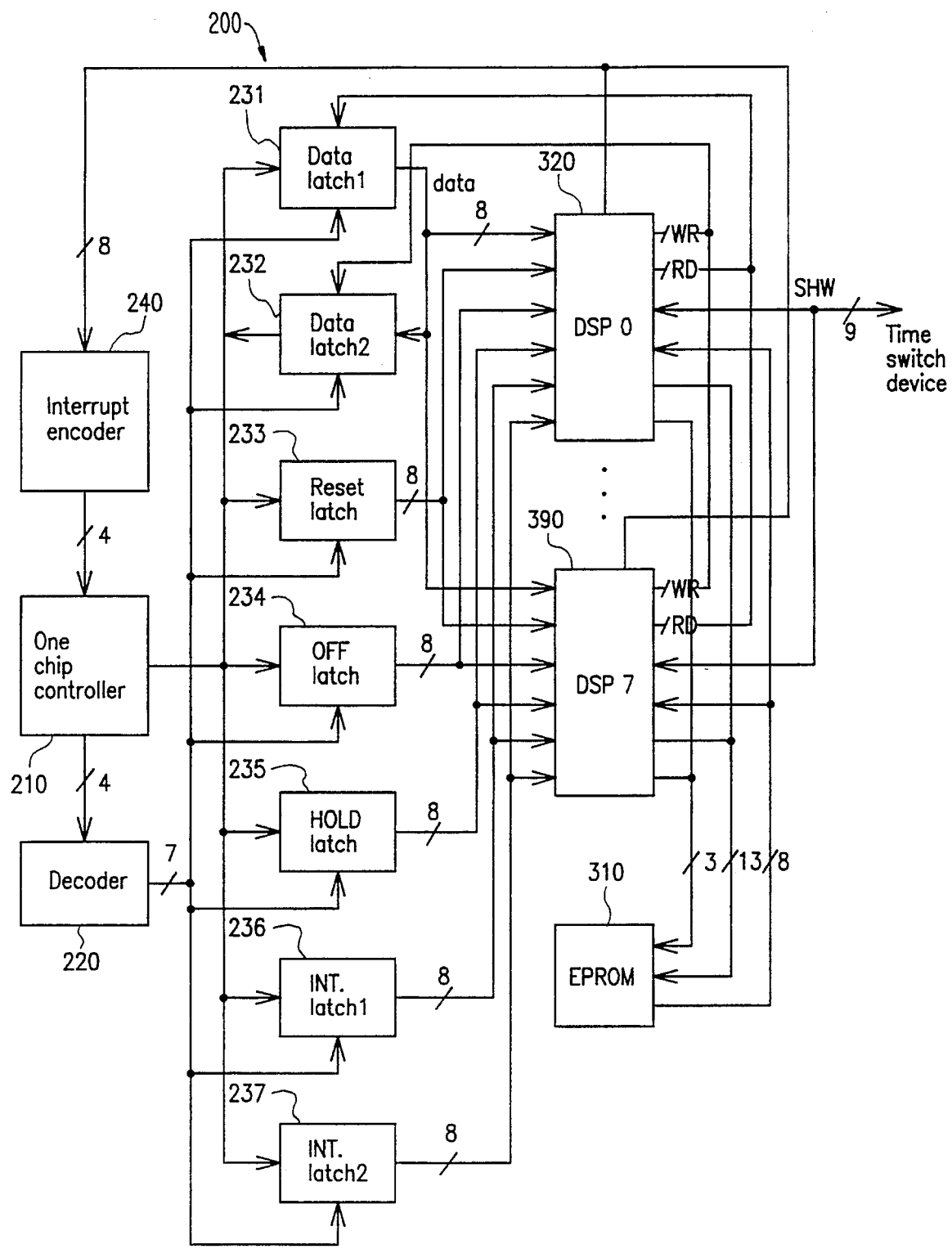
FIG. 2 illustrates the constitution of the hardware for the control circuit according to the present invention.

FIG. 2 illustrates a specific example of the present invention.

Referring to FIG. 2, the control section 200 includes: the one chip controller 210 for controlling and managing the total echo canceller circuit based on the stored program; seven latches 231–237 for assisting the communications between the eight DSPs 320–390 and the one chip controller 210 in an simple manner in response to the input signals; a decoder 220 for receiving four addresses among the addresses of the one chip controller 210 to decode them, and for sending the above signal to a relevant one of the latches 231–237 to enable it; and an interrupt encoder 240 for assisting the one chip controller 210 in processing the interrupts from the eight DSPs 320–390.

Referring to FIG. 2, when the one chip controller 210 sends the necessary information to the eight DSPs 320–390, the one chip controller 210 enables the first data latch 231 through the decoder 220 to write the information in it.

In this case, the eight DSPs 320–390 access to the first data latch by utilizing read signals/RD, thereby obtaining the information from the one chip controller 210.

On the other hand, in the case where the eight DSPs 320–390 respond to the one chip controller 210 or sends other data to the one chip controller 210, the information is written into the second data latch 232 by utilizing write signals.

In these cases, the one chip controller 210 enables the second data latch 232 through the decoder 220 to access the second data latch 232, and thus, the one chip controller 210 reads the information from the DSPs 320–390 through its own data port.

A reset latch 233 is connected to respective reset terminals of the eight DSPs 320–390.

The reset latch 239 is used when the one chip controller resets the respective eight DSPs 320–390.

That is, the reset latch 233 is used when the one chip controller 210 carries out reset enable or reset disable operations.

An off latch 234 is used when the one chip controller 210 enables or disables the off signals of the relevant DSP (which are the signals for stepping up the external bus of the relevant DSP and other signal lines to a high impedance).

A hold latch 235 is used when the one chip controller 210 enables or disables hold signals of the DSPs 320–390 upon encountering a need.

Particularly, in the embodiment of the present invention, selective hold modes are utilized based on the setting of internal registers (not shown) of the eight DSPs 320–390. Under the hold mode, even if a hold signal is supplied to an external terminal of the relevant DSP, the operation of the DSP is not halted. As long as the external bus is not accessed, the DSP which has been downloaded with the program from the EPROM 310 into its own memory can continuously carry out the DSP program.

Under this condition, however, the external bus and the signals line of the relevant DSP is in a high impedance status.

During the time when the eight DSPs 320–390 are downloaded with the DSP program from the EPROM 310, the first interrupt latch 236 is used when the one chip controller 210 sends the required interrupt to the relevant DSP. The second interrupt latch 237 is used when the one chip controller 210 sends an interrupt to the relevant DSP during the communications between the one chip controller 210 and the eight DSPs 320–390.

In response to a 4-bit address from the one chip controller 210, the decoder 220 selectively enables one of the seven latches 231–237.

Figure 3A:
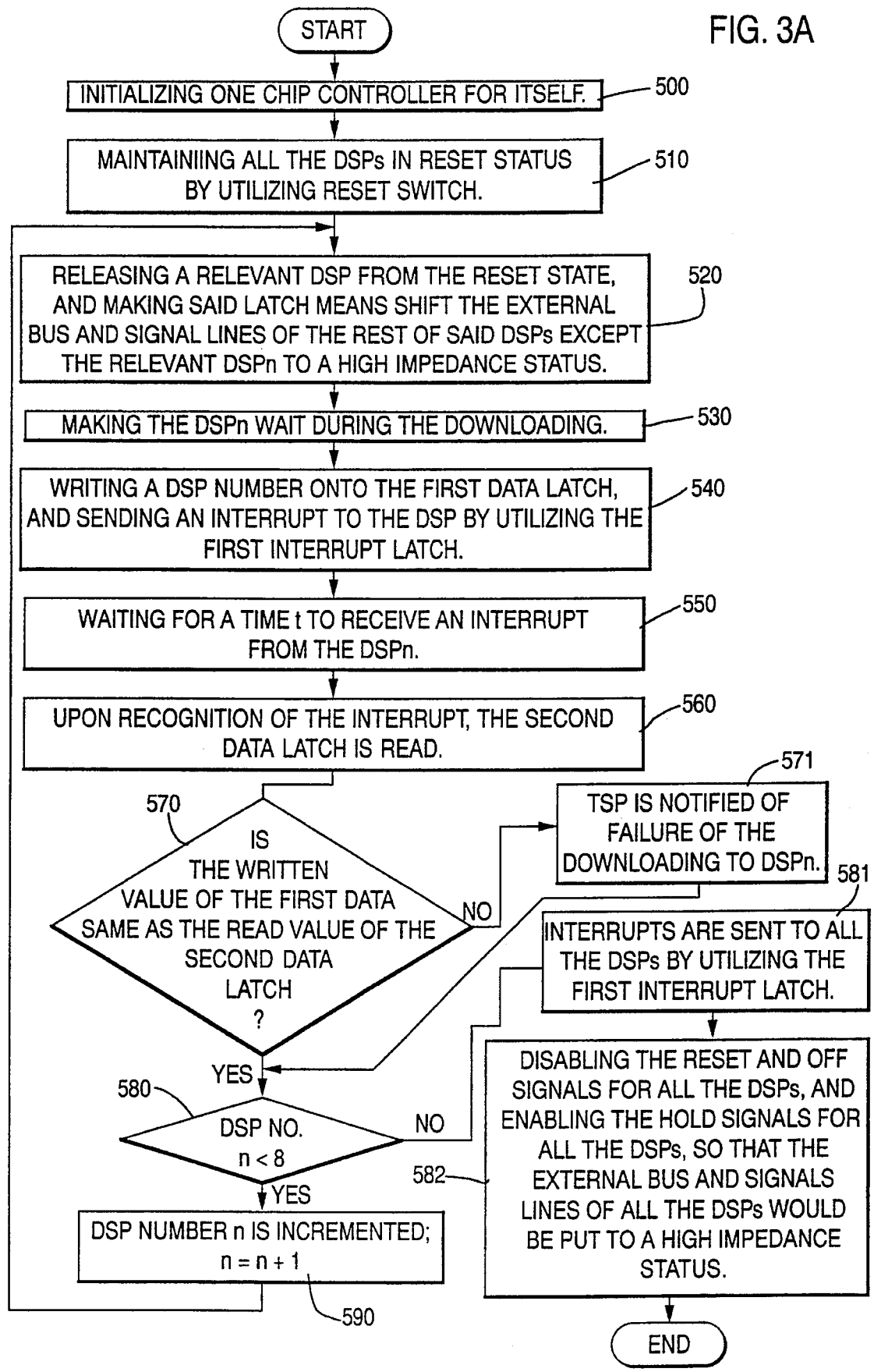
FIGS. 3a and 3b are flow charts showing the process of downloading a DSP program from an EPROM to a plurality of DSPs.
Figure 3B:
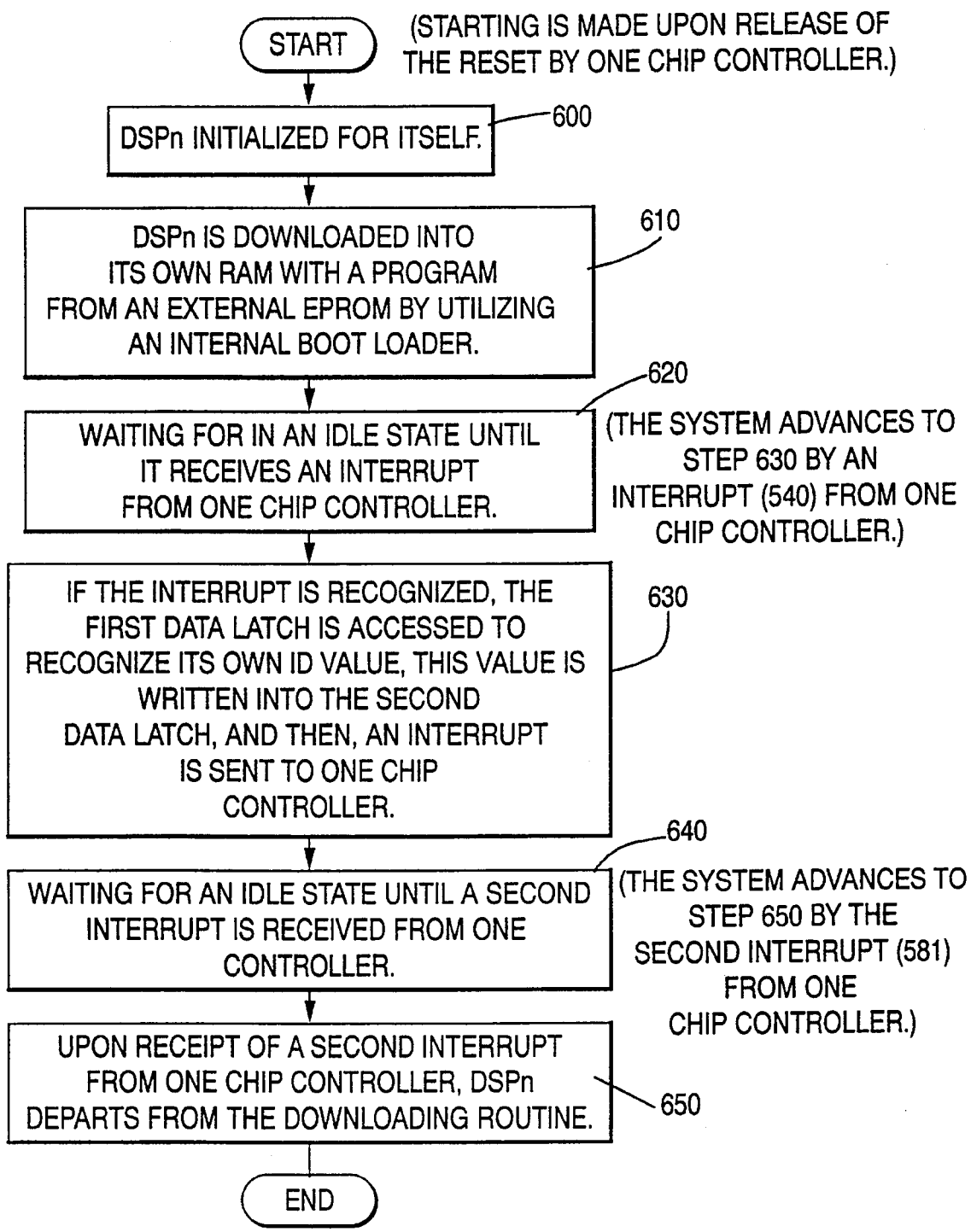

FIGS. 3A and 3B are flow charts showing the process of downloading the DSP program from the EPROM 310 to a plurality of DSPs 320–390.

The one chip controller 210 carries out various control functions based on its own programs, while the DSPs 320–390 carry out the functions of the digital adaptive filters in accordance with the DSP program which is downloaded from the EPROM 310.

In the preferred embodiment of the present invention, when the eight DSPs 320–390 have access to the external EPROM 310, the bus and signals lines are commonly used. Thus without a separate bus arbitration circuit, the one chip controller 210 controls the eight DSPs 320–390 through the respectively functioning latches 231–237. Thus there is provided a method for downloading the DSP program to the DSPs without collisions between the data.

Now the downloading process according to the present invention will be described referring to FIG. 3A and 3B.

First referring to FIG. 3A, the echo canceller system is placed in a power-on status or to a reset status. Then the one chip controller 210 is operated by the internally stored control program, so that the one chip controller 210 would be initialized to a pre-set situation (500).

After the completion of the initialization, the one chip controller 210 controls the reset latch 233 to placed the respective reset terminals of the eight DSP 320–390 at a low state, thereby maintaining all the DSPs 320–390 on a reset status (510).

Then, the one chip controller 210 starts the downloading of the DSP program from the EPROM 310 to the DSPs (520).

Under this condition, the downloading is done in a sequential manner starting from the DSP0 320 to the remaining DSPs.

When the downloading is started from the DSP0 320, only the reset and off signals of the DSP0 320 are disabled, and the respective reset and off signals of the DSPs (DSP1 330 to DSP7 390) are enabled, with the result that they maintain a reset status. Meanwhile, the external bus and signal lines are placed in a high impedance state.

Thus, when only the external bus and signal lines of the DSPs 330–390 are put to a high impedance status, then as shown in FIG. 3B, the DSP0 320 is self initialized 600. Then the DSP0 320 is downloaded with the DSP program into its own RAM from the EPROM 310 by utilizing the internal boot loader (610).

Under this condition, the external bus and signal lines of the seven DSPs 330–390 are place in a high impedance status as described above, and therefore, they do not have any influence on the downloading of the DSP0 320.

Meanwhile, as shown in FIG. 3A, the one chip controller 210 is placed in to a standby position during the downloading of the DSP0 320.

Then, after the completion of the downloading, the one chip controller 210 writes a DSP0 320 number onto the first data latch 231 to notify the DSP number of the DSP0 320 (the DSP number is used as an information for selecting 4 channels by each DSP among the 32 channels assigned to the echo canceller system). Then the one chip controller 210 sends an interrupt to the DSP0 320 by utilizing the first interrupt latch 236, so that the DSP0 320 can read the number (540).

Referring to FIG. 3B, The DSP0 320 is placed in an idle position from the time when it has completed the downloading (610), until when it receives an interrupt from the one chip controller 210 (620).

When the DSP0 320 receives an interrupt from the one chip controller 210, it reads the first data latch 231 to recognize its own number. Then the DSP0 320 notifies the one chip controller 210 that the downloading has been successfully carried out and that its own number has been confirmed. For this purpose, the DSP0 320 writes data the same as its own number on the second data latch 232, and generates an interrupt to the one chip controller 210 (630).

Referring to FIG. 3A, The one chip controller 210 waits for a certain period of time until an interrupt comes from the DSP0 320 (550).

At step (550), when the one chip controller 210 recognizes an interrupt from the DSP0 320, the one chip controller 210 reads the data written on the second data latch 232 (560), and then, the one chip controller 210 compares this value with the number for the DSP0 320 which was written on the first data latch 231 by the one chip controller 210, to confirm as to whether they correspond with each other (570).

Then, if it is found that the two values correspond with each other (if "yes" at step 570), it is meant that the downloading to the DSP0 320 has been successfully carried out. Therefore, a inquiry is made as to whether the number for the DSP which has just completed the downloading is smaller than 8 to determine if there remains any DSP to be downloaded (580).

If it is found that the remaining DSP number is smaller than 8 (if "yes" at step 580), then there remains other DSPs to be downloaded, and therefore, the DSP1 330 is started to be downloaded (590, 520–560).

At step (570), if it is found that the two values do not correspond with each other (if "no"), then the downloading is retried 3 more times.

If the three attempts of downloading are unsuccessful, then the failure of the downloading of the DSP0 320 is transmitted to the TSP (571).

The process of downloading the DSP1 330 is the same as that of the DSP0 320, except that the reset signal for the DSP0 320 is maintained in a disabled state, but the off signal is enabled, so that its external bus and signal lines are shifted to a high impedance status. Consequently, there arises no data collision during the downloading of the DSP1 330.

Of course, the reset and off signals for the DSP1 330 are in a disabled state, so that the EPROM 310 can be accessed by utilizing the external bus and signal lines. Further, the reset and off signals for the DSP 2 (340) to the DSP7 (390) are enabled, with the result that the external bus and signal lines are shifted to a high impedance status.

FIG. 4 is a table showing the status of reset and off signals of the respective DSPs when one of the DSPs is downloaded with the program from the EPROM.

When downloading to one of the DSPs is in progress, the reset and off signals for the respective DSPs maintain the state of the table of FIG. 4. At the same time, the DSP0 320 to the DSP7 390 are sequentially downloaded from the EPROM 310 under the control of the one chip controller 210 without a bus arbitration circuit.

When all the DSPs are completely downloaded, the one chip controller 210 terminates the downloading routine, and sends a second interrupt to all the DSPs 320–390 to command that they begin normal operations (581).

Upon receipt of the interrupt, the respective DSPs 320–390 set themselves to a hold mode, and begin their normal functions.

At the same time, the one chip controller 210 disables the reset and off signals for all the DSPs 320–390, and enables the hold signals for all the DSPs 320–390, so that the external bus and signal lines of the eight DSPs 320–390 are placed in a high impedance status (582).

Under this condition, since the respective DSPs 320–390 are under the hold mode, they can carry out the programs loaded in their RAMs, regardless of the enabled or disabled status of the hold signals.

In the above, descriptions were made for the case where the eight DSPs 320–390 are downloaded from a single EPROM 310. However, the number of the DSPs to be downloaded can be increased.

The communications between the one chip controller 210 and the DSPs 320–990 are classified into two cases, i.e., the case where information is transmitted from the one chip controller 210 to a DSPn, and the case where an information is transmitted from a DSPn to the one chip controller 210.

First, the case where information is transmitted from the one chip controller 210 to a DSPn will be described.

The one chip controller 210 Writes the information to be sent to the DSPn into the first data latch 231, and then, the one chip controller 210 disables the hold signals and sends an interrupt to the DSPn, so that the DSPn can have access to the first data latch 231, and can read the data written therein. Then the DSPn reads the data of the first data latch 231 to receive the information. Then, in order to notify that this information has been duly received, the DSPn writes on the second data latch 232 a data same as the received data of the first data latch, and sends an interrupt to the one chip controller 210.

Upon receipt of the interrupt, the one chip controller 210 accesses the second data latch 232, and compares the data of the second data latch 232 with its own data. If the two data are the same, this is an acknowledgment that the communications have been carried out in a correct manner. Therefore, the one chip controller 210 enables again the hold signal of the DSPn to shift the external bus and signal lines of the DSPn to a high impedance status. Then the one chip controller 210 exists from the communication routine.

If an interrupt does not come from the DSPn, or if the compared values are not the same, a new attempt is made. If an error is produced again, the hold signal of the DSPn is enabled again to shift the external bus and signal lines to a high impedance status. Then the abnormality of the DSPn is transmitted to the TSP, and then, the one chip controller 210 exits from the communication routine.

Meanwhile, the case where information is transmitted from a DSPn to the one chip controller 210 will be described.

The DSPn which has information to be transmitted sends an interrupt to the one chip controller 210 to signal that there is information to be sent to the one chip controller 210. Then the DSPn enters into an idle state. Then the one chip controller 210 accesses the interrupt encoder 240 to determine to which DSP has been sent the interrupt. Then the one chip controller 210 disables the hold signal of the relevant DSPn, and writes in the first data latch 231 data signifying that it may sent the information. Then the one chip controller 210 sends an interrupt to the relevant DSPn through the second data latch 292, and then, the DSPn exits from the idle status in accordance with the interrupt of the one chip controller 210. Then the DSPn accesses the first data latch 231 to read the information written therein, and confirms the transmission of the data. Then the DSPn writes the information on the second data latch 232, and sends an interrupt to the one chip controller 210 to signal that information has been sent.

Then the one chip controller 210 accesses the second data latch 292 to receive the information sent by the DSPn, and enables again the hold signal of the DSPn to shift the external bus and signal lines to a high impedance. Then the one chip controller 210 exits from the communication routine.

According to the present invention as described above, a special feature is provided. That is, when the plurality of the DSPs are downloaded with a program from the EPROM 310, or when, after the downloading, a communication occurs out between one of the DSPs and the one chip controller 210 during the normal operation, the downloading and the communication can be made without a bus arbitration circuit, thereby preventing the collision of the data.

Therefore, the respective DSPs do not have to be provided with ROMs and RAMs for the DSP programs respectively with only a single EPROM 310 being sufficient. Further, the DSP program is not loaded into an external memory, but instead is loaded in an internal RAM, making the executing speed very fast.

Further, the quantity of communications between the TSP and the one chip controller 210 is small, and the communications between the one chip controller 210 and any one of the DSPs are also relatively small. Further, the receiving and transmission of the PCM voice data (i.e., the echo canceller data) are done through the serial ports of the respective DSPs. Further, additional ROMs or RAMs for the DSPs are not needed, and a separate bus arbitration circuit for the bus arbitrations is not needed. Therefore, if an echo canceller circuit is made by utilizing the present invention, the fabrication of the circuit is easy, and the product becomes compact, while the manufacturing cost is reduced.

What is claimed is:

1. A method for controlling an echo canceller circuit including a bus matching circuit for sending and receiving information to and from a time switched control processor of a public land mobile network, a buffer for temporarily storing information transmitted between the time switched control processor and the echo canceller circuit, a data storage for storing a program for processing digital signals to cancel the echo in PCM encoded voice data, a plurality of digital signal processors which are downloaded with the program to carry out removal of the echo in PCM encoded voice data, a one chip controller for performing control functions of the echo canceller circuit, a decoder for receiving addresses outputted from the one chip controller for selecting a device in accordance with the received address, a latch circuit for latching control data required for controlling the plurality of digital signal processors by the one chip controller, an interrupt encoder for sending the required control data to the one chip controller to provide an identification of which digital signal processor of the plurality of digital signal processors generated an interrupt, and a matching circuit for transmitting PCM encoded voice data to a time switch device, said method comprising the steps:

after completion of initialization the one chip controller, controlling a reset latch to place respective reset terminals of the digital signal processors in a first state to maintain all of the digital signal processors in a reset state;

releasing one digital signal processor from the reset state for downloading the program to the one released digital signal processor from the data storage and downloading the program to the one released digital signal processor from the data storage and processing the PCM encoded data with the program to remove the echo from the PCM encoded voice data;

causing the latch circuit to place an external bus and signal lines of all of the plurality of digital signal processors except the one digital signal processor in a high impedance status and then, starting a downloading of the program to the released one digital signal processor;

waiting when the downloading of the program to the released one digital signal processor is being performed;

after the completion of the downloading of the program, writing a number of the released one digital signal processor into a first data latch to signal the number of the one released digital signal processor to the released one digital signal processor and sending an interrupt to another one of the plurality of digital signal processors;

writing the number of the one released digital signal processor into a second data latch;

waiting for a period of time until an interrupt comes from the another one of the plurality of digital signal processors;

upon recognizing the interrupt from the another one of the plurality of digital signal processors, reading data written into the second data latch, and making a comparison to determine if a value of the data written into the second data latch corresponds to a value of the data written into the first data latch;

if it is determined that the two values correspond with each other, determining if the downloading to the another one of the plurality of digital signal processors has been successfully carried out, and checking if any other of the plurality of digital signal processors is to be downloaded with the program;

if it is determined that there are other of the plurality of digital signal processors to be downloaded with the program, downloading the program to the other of the plurality of the digital signal processors from the data storage and;

if it is determined that the two values do not correspond with each other attempting to again download the program to the other of the plurality of digital signal processors;

if the attempting to again download is unsuccessful, signalling a failure of the downloading to the other of the plurality of digital signal processors to the time switched control processor;

when downloading of all of the plurality of digital signal processors with the program is completed, sending a second interrupt to all of the plurality of digital signal processors through the second data latch to command all of the digital signal processors to terminate downloading and resume their operations;

disabling reset and off signals for all of the plurality of digital signal processors, and enabling hold signals for all of the plurality of digital signal processors so that the external bus and signal lines of all of the plurality of digital signal processors are placed in a high impedance status; and the plurality of digital signal processors process the PCM encoded data with the program to remove the echo from the PCM encoded data.

2. A method for controlling an echo canceller circuit including a data storage for storing a program for processing digital signals to cancel an echo in PCM encoded voice data, a plurality of digital signal processors each having a reset terminal and which are downloaded with the program which is executed by the plurality of digital signal processors to carry out removal of the echo in the PCM encoded voice data, and a one chip controller for performing control functions of the echo canceller, said method comprising the steps:

after completion of initialization of the one chip controller, controlling the reset terminals of the digital signal processors to maintain all of the digital signal processors in a reset state;

releasing one of the plurality of digital signal processors from the reset state and downloading the program to the one released digital signal processor from the data storage;

the released one digital signal processor processing the PCM encoded voice data with the program to remove the echo from the PCM encoded voice data 1 releasing another one of the plurality of digital signal processors from the reset state and downloading the program to the another released digital signal processor from the data storage; and the released another digital signal processor processing the PCM encoded voice data with the program to remove the echo from the PCM encoded voice data.

3. A method in accordance with claim 2 wherein:

the echo canceller includes a latch circuit for latching control data required for controlling the plurality of digital signal processors by the one chip controller and an external bus;

the latch circuit is caused to place the external bus and signal buses of all of the plurality of digital signal processors except the one digital signal processor in a high impedance status and starts the downloading of the program to the released one digital signal processor.

4. A method in accordance with claim 3 further comprising:

after the completion of the downloading of the program, writing a number of the released one digital signal processor into a first data latch to signal the number of the one released digital signal processor to the released one digital signal processor and sending an interrupt to another one of the plurality of digital signal processors; and upon recognizing the interrupt from the another one of the plurality of digital signal processors, reading data written into a second data latch, and making a comparison to determine if a value of the data written into the second data latch corresponds to a value of the data written into the first data latch.

5. A method in accordance with claim 4 further comprising:

if it is determined that the values written into the first and second latches correspond with each other, determining if the downloading to the another one of the plurality of digital signal processors has been successfully carried out, and checking if any other of the plurality of digital signal processors is to be downloaded with the program;

if it is determined that there are other of the plurality of digital signal processors to be downloaded with the program, downloading the program to the other of the plurality of the digital signal processors;

if it is determined that the two values do not correspond with each other attempting to again download the program to the other of the plurality of digital signal processors;

if the attempting to again download is unsuccessful, signalling a failure of the downloading to the other of the plurality of digital signal processors to the time switched control processor;

when downloading of all of the plurality of digital signal processors is completed, sending a second interrupt to all of the plurality of digital signal processors through the second data latch to command all of the digital signal processors to terminate downloading and resume their operations; and disabling reset and off signals for all of the plurality of digital signal processors, and enabling hold signals for all of the plurality of digital signal processors so that the external bus and signal lines of all of the plurality of digital signal processors are placed in a high impedance status.

* * * * *